ns patent
Patented May 13, 1969

3,444,292
BUFFERED ANTIPERSPIRANT COMPOSITIONS CONTAINING DIOXALUMOLANE AND DIOX-ALUMINANE COMPOUNDS
Stewart M. Beekman, Signal Mountain, and James M. Holbert, Lookout Mountain, Tenn., and Horst W. Schmank, Ringgold, Ga., assignors to The Chattanooga Medicine Company, Chattanooga, Tenn., a corporation of Tennessee
No Drawing. Filed May 5, 1966, Ser. No. 547,729
Int. Cl. A61k 7/00
U.S. Cl. 424—68           9 Claims

ABSTRACT OF THE DISCLOSURE

Antiperspirant compositions comprising a mixture of a chloro-dioxaluminane with a buffering agent consisting of an aluminum nitrilo compound which controls the acidity of the resulting composition.

---

The present invention relates to antiperspirant compositions, and particularly those which are dispensed in the form of an aerosol.

In our copending application, Ser. No. 546,557 filed May 2, 1966, entitled, "Heterocyclic Aluminum Compounds and Method of Preparing Same," the disclosure of which is hereby incorporated by reference, we have described a series of heterocyclic aluminum compounds which evidence positive antiperspirant activity, which are readily soluble in anhydrous (95 to 100%) ethanol and are compatible with fluorocarbon propellants.

The compositions of the copending application are all definitely acidic, and vary in acidity from dermatologically acceptable values to acidities which are high enough to be marginal, as far as toleration on the skin is concerned. Consequently, the compositions described in that application have varying effects on the tensile strength of fabrics with which they come in contact, and have different reactions on the skin.

One of the objects of the present invention is to provide an improved composition including heterocyclic aluminum antiperspirant compounds combined with a buffering agent which controls the acidity of the resulting mixture to a dermatologically acceptable range.

Still another object of the invention is to provide antiperspirant compositions including a mixture of a heterocyclic aluminum compound and a buffering agent which are soluble in ethanol and which are compatible with fluorocarbon propellants.

The antiperspirant compounds used in accordance with the present invention have the following generic formula:

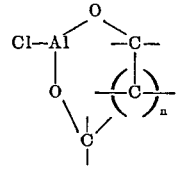

where $n$ is an integer from 0 to 1.

As indicated in the above structural formula, the heterocyclic compounds of the present invention include a ring structure which may number from 5 to 6 atoms in the ring. The linkage:

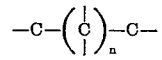

forming part of the above identified structural formula is preferably a residue of an aliphatic polyhydric alcohol having from 3 to 6 carbon atoms per molecule and having hydroxyl atoms on carbon atoms which are spaced apart by no more than one intervening carbon atom.

The valence bonds shown in the above structural formula should be attached to groups which do not have an adverse effect upon the solubility or the acidity of the resulting compound, and should preferably be either hydrogen atoms, hydroxyl groups, or low alkyl chains (up to 3 carbon atoms).

The above identified compounds can be prepared by reacting substantially equimolar proportions of chloroaluminum diisopropoxide with a 3 to 6 carbon atom aliphatic polyhydric alcohol having hydroxyl groups on carbon atoms which are spaced apart by no more than one intervening carbon atom in a reaction medium of substantially anhydrous alcohol. The reaction is quite exothermic and usually requires no added heat to continue it. After the reaction has proceeded, the excess anhydrous alcohol is removed, and the resulting reaction product is dried, preferably under reduced pressure or vacuum conditions.

The following compounds are illustrative of the compounds which can be used in accordance with the present invention:

(a) 2-chloro-4-methyl-1,2,3-dioxalumolane

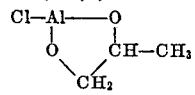

(b) 2-chloro-4,5-dimethyl-1,3,2-dioxalumolane

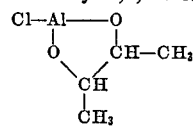

(c) 2-chloro-4-methyl-5-ethyl-1,3,2-dioxalumolane

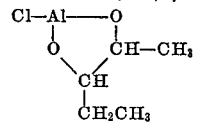

(d) 2-chloro-4,5-diethyl-1,3,2-dioxalumolane

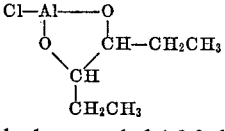

(e) 2-chloro-4-hydroxymethyl-1,3,2-dioxalumolane

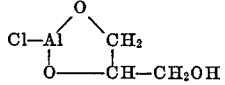

(f) 2-chloro-1,3,2-dioxaluminane

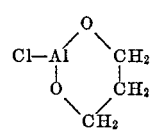

(g) 2-chloro-4-methyl-1,3,2-dioxaluminane

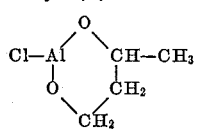

(h) 2-chloro-5-hydroxy-1,3,2-dioxaluminane

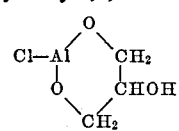

(i) 2-chloro-4,4,6-trimethyl-1,3,2-dioxaluminane

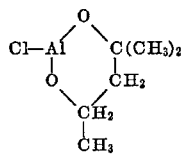

(j) 2-chloro-4-propyl-5-ethyl-1,3,2-dioxaluminane

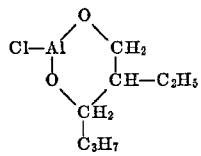

The buffering agents which have been found to effectively reduce the acidity of the more acid compounds mentioned above are aluminum nitrilo compounds having the following general formula:

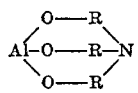

where R is an alkylene group containing from 2 to 4 carbon atoms.

Particularly preferred compounds in accordance with the present invention are listed below:

Aluminum nitrilo triethoxide:

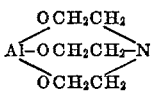

Aluminum nitrilo triisopropoxide:

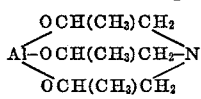

Aluminum nitrilo tributoxide:

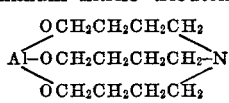

The nitrilo compounds are white solid powders which can be formed by reacting aluminum isopropoxide liquid with alkanol amines such as triethanolamine, triisopropanolamine, or tributanolamine, and distilling off the by-product isopropoyl alcohol. The solidified product may be ground to any particle size distribution. The compounds are soluble in ethanol, insoluble in water, and react with water to form aluminum hydroxide. The pH of aqueous dispersions of these materials are alkaline and usually are on the order of about 9.4.

For further details of the methods of preparing these nitrilo compounds, reference is invited to British Patent No. 941,692.

The amount of buffering compound added should not be in excess of about 4% by weight of the total aerosol composition and is preferably in the range from about 1 to 2% by weight. This amount of buffering agent is normally sufficient to raise the pH to a value of 4.1 to 4.5 which is the most desirable range. The pH range specified is based upon a 5% by weight solution of the mixture in an alcohol-water system containing sufficient alcohol to dissolve the mixture.

The amount of anhydrous ethanol added will normally be in the range from 30 to 70% by weight of the total aerosol composition, and the liquefied, normally gaseous propellant would also be in the range from about 30% to 70% by weight. The composition, of course, may include other additives typically present in antiperspirant compositions of the aerosol type, such as perfume materials, bacteriostatic agents, and the like. Such additives, generally, do not exceed about 2% by weight.

The following specific examples illustrate the usefulness of the buffered mixtures of the present invention.

EXAMPLES

One part of 2-chloro-4-methyl-1,3,2-dioxalumolane was dissolved in 3 parts of anhydrous ethanol to produce a 25% w./w. ethanol solution. One part of the 25% w./w. solution was added to 5 parts of water, and the pH was found to be 3.8. Then, 0.1 mol of aluminum nitrilo triethoxide was disolved in one mol of the 25% w./w. solution of the antiperspirant compound. The pH of the resulting mixture, measured as described previously, was about 4.0. The addition of 0.2 mol of the buffering agent under the same conditions resulted in an increase of the pH to about 4.1. The addition of 0.3 mol of the buffering agent increased the pH to 4.3, 0.5 mol to about 4.8, 0.75 mol to 6.3, and 1 mol produced a pH of 7.0. All solutions in alcohol were clear.

When 20% w./w. of the 25% dioxalumolane-aluminum nitrilo triethoxide solutions were mixed with 35% w./w. anhydrous ethanol and fitted into an aerosol container with 45% w./w. propellant (40% dichlorofluoromethane, 60% dichlorotetrafluoroethane) equipped with a suitable valve, the resulting aerosols were clear, homogeneous systems. They remained clear and apparently unchanged in character when stored at 45° F., ambient temperature, 100° F., and 110° F.

An aerosol prepared with 0.2 mol of aluminum nitrilo triethoxide and 1 mol of 2-chloro-4-methyl-1,3,2-dioxalumolane was sprayed on the skin after bathing without the slight tingling or burning sensation sometimes experienced with the unbuffered dioxalumolane compound. Moreover, the fabric destruction test carried out by the method described in the Dec. 6, 1945 issue of the "Proceedings of the Scientific Section of the Toilet Goods Association" showed no loss in tensile strength when 0.2 mol of the buffering compound was added to 1 mol of the antiperspirant. In contrast, there was a loss in tensile strength of 7.5% when the unbuffered antiperspirant compound was similarly tested.

It should be understood, of course, that the aerosol formulations mentioned in the foregoing examples are strictly typical, and that any of the wide variety of fluorocarbons used for aerosol compositions, or mixtures of the same, can be used, depending upon the vapor pressure desired in the container. The compositions of the present invention have been found to be completely compatible with these fluorocarbons.

We claim as our invention:

1. A buffered antiperspirant composition comprising an effective amount of an antiperspirant compound having the formula:

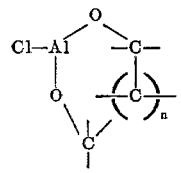

where $n$ is an integer from 0 to 1, and the unsatisfied valence bonds are attached to a member of the group consisting of hydrogen atoms, hydroxyl groups and alkyl groups of up to 3 carbon atoms, in admixture with a buffering compound having the formula:

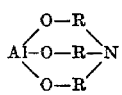

where R is an alkylene group containing from 2 to 4 carbon atoms, said buffering compound being present in sufficient amounts to provide a pH in the mixture at a dermatologically acceptable value.

2. The composition of claim 1 which also includes a liquefied normally gaseous fluorocarbon propellant in an amount sufficient to form an aerosol.

3. The composition of claim 1 in which the pH of said mixture in a 5% solution in ethanol-water is in the range from about 4.1 to 4.5.

4. The composition of claim 1 in which the mixture is dissolved in ethanol and includes a liquefied normally gaseous fluorocarbon propellant in sufficient amounts to form an aerosol.

5. The composition of claim 4 in which the buffering compound comprises not more than 4% by weight of said aerosol.

6. The composition of claim 4 in which the antiperspirant compound is present in an amount of about 5 to 8% by weight of the aerosol and the buffering compound is present in an amount not exceeding 4% by weight of said aerosol.

7. The composition of claim 1 in which said antiperspirant compound is 2-chloro-4-methyl-1,3,2-dioxalumolane.

8. The composition of claim 1 in which said antiperspirant compound is 2-chloro-4-methyl-1,3,2-dioxalumolane and said buffering compound is aluminum nitrilo triethoxide.

9. A stable homogeneous aerosol composition comprising from about 5 to 8% by weight of 2-chloro-4-methyl-1,3,2-dioxalumolane, up to 4% by weight of aluminum nitrilo triethoxide, ethanol, and a liquefied normally gaseous fluorocarbon propellant.

References Cited
UNITED STATES PATENTS 2,823,169    2/1958    Brown et al. _____ 167—90

FOREIGN PATENTS 941,692    11/1963    Great Britain.

ALBERT T. MYERS, *Primary Examiner.*

D. R. MAHANAND, *Assistant Examiner.*

U.S. Cl. X.R.

260—448

UNITED STATES PATENT OFFICE
CERTIFICATE OF CORRECTION

Patent No. 3,444,292      Dated May 13, 1969

Inventor(s) Stewart M. Beekman, James M. Holbert & Horst W. Schmank

It is certified that error appears in the above-identified patent and that said Letters Patent are hereby corrected as shown below:

Column 2, line 24, formula (a) should read:
-- 2-chloro-4-methyl-1,3,2-dioxalumolane--.

Column 3, formula (i) should appear as follows:

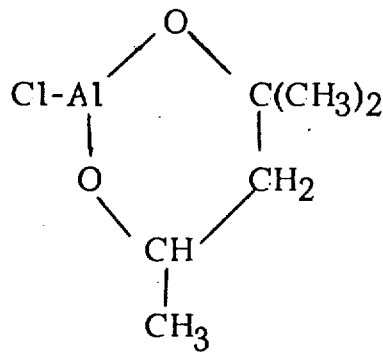

Column 3, formula (j) should appear as follows:

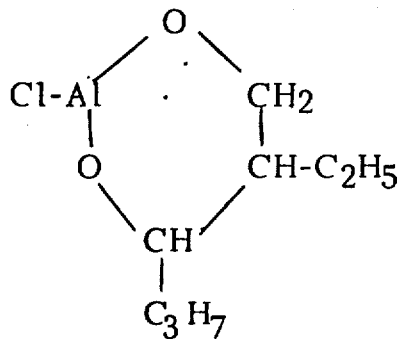

SIGNED AND
SEALED
FEB 24 1970

(SEAL)
Attest:

Edward M. Fletcher, Jr.
Attesting Officer

WILLIAM E. SCHUYLER, JR.
Commissioner of Patents